(12) United States Patent
De Lissandri

(10) Patent No.: US 9,445,134 B2
(45) Date of Patent: Sep. 13, 2016

(54) MULTIMEDIA AND MULTICHANNEL INFORMATION SYSTEM

(71) Applicant: Radio Marconi S.R.L., Calco (LC) (IT)

(72) Inventor: Stefano De Lissandri, Imbersago (IT)

( * ) Notice: Subject to any disclaimer, the term of this patent is extended or adjusted under 35 U.S.C. 154(b) by 50 days.

(21) Appl. No.: 14/293,491

(22) Filed: Jun. 2, 2014

(65) Prior Publication Data

US 2014/0325571 A1  Oct. 30, 2014

Related U.S. Application Data

(63) Continuation of application No. 12/600,138, filed as application No. PCT/IT2008/000314 on May 12, 2008, now abandoned.

(30) Foreign Application Priority Data

May 16, 2007 (IT) .................................. 2007A0358

(51) Int. Cl.
*G06F 15/16* (2006.01)
*H04N 21/2187* (2011.01)
*H04H 20/63* (2008.01)
*H04N 7/173* (2011.01)
(Continued)

(52) U.S. Cl.
CPC .......... *H04N 21/2187* (2013.01); *H04H 20/63* (2013.01); *H04N 7/17318* (2013.01); *H04N 21/2143* (2013.01); *H04N 21/2146* (2013.01); *H04N 21/25841* (2013.01); *H04N 21/414* (2013.01); *H04N 21/41407* (2013.01); *H04N 21/426* (2013.01); *H04N 21/42224* (2013.01); *H04N 21/42607* (2013.01); *H04N 21/42653* (2013.01); *H04N 21/6402* (2013.01)

(58) Field of Classification Search
CPC ............ H04H 20/63; H04N 21/2143; H04N 21/2146; H04N 21/2187; H04N 21/25841; H04N 21/414; H04N 21/41407; H04N 21/42224; H04N 21/426; H04N 21/42607; H04N 21/42653; H04N 21/6402
USPC ............ 370/261, 263, 270, 310, 310.2, 328, 370/338, 350, 390; 725/63, 87, 93, 116; 705/51, 67, 902
See application file for complete search history.

(56) References Cited

U.S. PATENT DOCUMENTS 4,521,881 A * 6/1985 Stapleford ............. H04Q 11/02
370/488
5,745,159 A  4/1998 Wax et al.
(Continued)

FOREIGN PATENT DOCUMENTS

EP  0762154 A2  3/1997

*Primary Examiner* — Mohamed Kamara

(57) ABSTRACT

The invention relates to a multimedia and multichannel information system for an interactive distribution of at least one real-time video input of a live event taking place in an auditorium. The system comprises a central unit and a plurality of remote units located in the auditorium. At least one of the plurality of remote units is connected to the central unit by means of a bi-directional transmission network for interactive communications between the remote units and the central unit, the at least one remote unit is provided with at least an interface and with audio/video, data and graphic accelerators disposed on a multimedia microprocessor housed in the remote units. The at least one remote unit is equipped with a touch screen display and is configured to display the at least one real-time video input of the live event taking place in the auditorium.

20 Claims, 9 Drawing Sheets

(51) Int. Cl.
*H04N 21/214* (2011.01)
*H04N 21/258* (2011.01)
*H04N 21/414* (2011.01)
*H04N 21/426* (2011.01)
*H04N 21/6402* (2011.01)
*H04N 21/422* (2011.01)

(56) References Cited

U.S. PATENT DOCUMENTS

| | | | |
|---|---|---|---|
| 5,821,985 A | 10/1998 | Iizawa | |
| 5,973,722 A | 10/1999 | Wakai et al. | |
| 6,952,558 B2 * | 10/2005 | Hardacker | H04L 67/26 340/6.1 |
| 7,019,723 B2 | 3/2006 | Tsuji | |
| 7,046,137 B2 | 5/2006 | Palmquist | |
| 7,339,492 B1 | 3/2008 | Alexander | |
| 7,794,014 B2 | 9/2010 | Beall et al. | |
| 7,966,636 B2 * | 6/2011 | Arseneau | H04N 5/44591 725/100 |
| 2002/0093709 A1 | 7/2002 | Kim et al. | |
| 2002/0107965 A1 * | 8/2002 | Piccionelli | G06Q 30/0236 709/225 |
| 2003/0079058 A1 | 4/2003 | Lum | |
| 2003/0134627 A1 * | 7/2003 | Himmel | H04M 1/7253 455/419 |
| 2003/0189589 A1 * | 10/2003 | LeBlanc | G11B 27/031 715/723 |
| 2004/0008635 A1 | 1/2004 | Nelson et al. | |
| 2004/0064210 A1 | 4/2004 | Puryear et al. | |
| 2004/0210824 A1 | 10/2004 | Shoff et al. | |
| 2005/0015815 A1 | 1/2005 | Shoff et al. | |
| 2005/0050574 A1 | 3/2005 | Chiquin | |
| 2005/0206721 A1 | 9/2005 | Bushmitch et al. | |
| 2005/0289615 A1 | 12/2005 | Nishitani | |
| 2006/0068824 A1 | 3/2006 | Inselberg | |
| 2006/0165225 A1 | 7/2006 | Sahashi | |
| 2006/0174297 A1 | 8/2006 | Anderson, Jr. et al. | |
| 2007/0021058 A1 | 1/2007 | Arseneau et al. | |
| 2007/0022055 A1 * | 1/2007 | Eliason | G06F 21/10 705/51 |
| 2007/0024239 A1 | 2/2007 | Park | |
| 2008/0051195 A1 | 2/2008 | Hedrick et al. | |
| 2009/0030287 A1 | 1/2009 | Pradeep et al. | |

* cited by examiner

MULTIMEDIA AND MULTICHANNEL INFORMATION SYSTEM

CROSS REFERENCE TO RELATED APPLICATIONS

This application is a continuation of U.S. patent application Ser. No. 12/600,138, filed Nov. 13, 2009, which is the United States national phase of International Patent Application No. PCT/IT2008/000314, filed May 12, 2008, which claims priority to Italian Patent Application No. BO 2007 A 000358, filed May 16, 2007, which are incorporated herein by reference in their entirety.

BACKGROUND OF THE INVENTION

1. Field of the Invention
2. Description of Related Art

The present invention relates to a multimedia and multi-channel information system. In particular, this system can be used in the interactive field between a centralized system and a plurality of remote bases and among the same remote bases during conferences and congresses, in theatres, during sports events and in the didactic and cultural field.

Information systems are described in the following documents US20040000008635, US2005015815, US20050206721, US20050289615, U.S. Pat. No. 7,019,723, U.S. Pat. No. 7,046,137.

The known systems have drawbacks which determine functional and structural limitations, as described below.

As regards text display technologies, a first kind of limitation is connected with a poor application flexibility and display technologies which have been created to represent text formats with an extremely reduced or inexistent resolution and with a poor quality, a poor colour control and reduced flexibility. Although these techniques allow the display of graphic images, they also show the above limitations as regards quality and appear obsolete in comparison with the current state of art of text and graphic displays of instruments commonly used such as mobile phones, personal computers and so on.

As regards the technologies used for the utilization during congresses, such limitations are typical of systems employed in events where audio-video technologies are only present in a univocal format imposed on all spectators (video-projections, meeting rooms, videoconferences). It is not possible to customize contents that can be controlled from every single remote position.

A second limitation in known technologies arises from the fact that the spectator passively watches the event but such event is of the owner of the event and the same event does not allow any information storage functions.

On the one hand, this fact prevents the user from answering and from obtaining for more time the event and, on the other hand, it prevents the operator from providing information and contents as well as from further exploiting this functionality.

A third drawback in the previous technologies arises from the fact that the message is only visual while the audio aspect is totally absent (audio signal not provided).

SUMMARY OF THE INVENTION

The aim of the present invention is to provide a system capable of overcoming the above drawbacks.

This result has been achieved according to the invention thanks to the idea of realizing a system having the features described in claim 1. Other features relate to the dependent claims.

Among the advantages of the present invention, there are those described below. With respect to the known techniques, as extremely innovative aspect is that of the bi-directionality of communications between the user and the operator of the system. This allows the use of the system for specific content requests on the display screen such as films, data, statistics, live channels or audio translations, as well as central system access requests for declarations, votes or to store selectable contents. The single remote positions are enabled for sending information and data to the central unit, a functionality which is useful for conferences, meetings and for didactic purposes.

Thanks to an extremely reduced consumption, each remote unit can adopt a revolutionary approach to a duplex data reception capable of combining a slow recharge of the buffer battery by using the same data conductors. The display takes place on receivers capable of operating colour monitors.

The flexibility of the video interface contained in the remote units allows the use of screens of any size and renders the system valid in a wide variety of applications and useful for users with audio-visual handicaps.

Moreover, the invention is easy to use, a single trackball mouse or a touch screen allow the user to use it.

Further advantages of the invention are connected with the fact that the system of the present invention allows the acquisition and the storage of digital contents and its spreading in a very flexible and open environment; it also allows both the user and the operator of the system to use said system easily.

The system also consists of a distribution network which is either wired or wireless and, through an owner's protocol, it allows an easy distribution of information in real time even on thousands of remote control units.

Multimedia remote units, which are "intelligent", compact, modular and with low energy consumption, are capable of interacting with the centralized system and among themselves through a bidirectional communication system which is independent of the first data distribution level.

The present invention is equally suitable for indoor, outdoor and wireless uses and can be interfaced with last-generation digital systems such as portable televisions and mobile telephony in an environmental contest with delimited boundaries (for example an auditorium).

The flexibility of contents is substantially total because any video or audio format can be accepted by the system software which is capable of working it out and converting it into a format which can be accepted by receivers and which is also capable of sending it to said receivers.

Data distribution can take place in a compressed modality according to the owner's protocol which allows the encrypting of articulated structure packages provided with an auto-resetting system in case of error.

Moreover, the system comprises a second high-speed bidirectional communication level for a quick information exchange between central units and remote units as well as among remote units.

The system allows the distribution of both stored contents on any support (CD, DVD, memory card) and of real-time contents (video inputs from cameras, audio inputs from microphones) as well as a direct modality network distribution on selection or a recording modality network distribution on request.

The user preferably operates the system by means of a single function key, by means of a touch screen, a trackball, a joystick or a simplified keyboard so that he can use the functions required by a complex audio and video data technology combined with an extremely simple use, without any configuration or usage course for the user who can change every time.

On the operator's own will, the user can be authorized to partially or totally download data through a compatible port or by using a memory stick or an owner's or standard memory card. It is foreseen to use a USB port for the same purposes.

The same port can be used to access service enabling keys for some or all the available channels and to have access to transmission of information towards the central unit so as to allow a dynamic and customized allocation of the unit itself, with an automatic recognition of the user performed by the central system which dynamically assigns the membership of the device (according to the language, company, importance, user's area or location, user's functions and so on) recognized. Selected users will be able to send data towards the system according to modalities that can be customized by the operator (such as audio and video inputs, preference data, brief data packages or voting).

The system is also capable of storing the choice of every single position of the channels which are being displayed or listened to and of the downloaded data, so as to allow a display of statistics which are useful both for the administrator and for the audience.

The central operating unit decides on the interactivity of each single unit and is capable of assigning different display and fruition enabling of the event.

Everything has been conceived with the utmost transparency and simplicity of use so that the user can obtain all the information available from the event he is watching as regards the available quantity and quality and with the utmost freedom of choice. The system is conceived as a network operated by a single central unit: this results in an absolutely modular and expandable system.

It is possible to introduce devices into the distribution network which are capable of regenerating and decoupling the signal towards the remaining circuit. In order to exemplify and to better enhance some of the new and innovative aspects, the advantages of the present invention, with respect to a possible embodiment of a traditional PC network or palmtop computer system used for the same purposes will be listed below.

Above all, the invention has the advantage of using remote units which are expressly dedicated to the purpose, with audio-video interfaces and accelerators, as well as graphics chips, so as to render the circuit extremely compact.

The strong calculation capability of the processor, combined with low consumption, allows a reduced thermal dissipation which is very useful in case of applications in environments with no interchange possibilities for the hot air to be eliminated. This proves extremely useful when said devices are installed inside armchairs.

There are no moving or noisy parts (such as fans or hard disks for example) and this renders the application particularly suitable for environments with specific acoustic requirements (auditoriums or theatres).

The signal distribution network is extremely easy to control and does not require a configuration for each remote unit whenever said unit is to be inserted into the system. The signal and power supply distribution takes place by means of a single cable with two conductors inside it, in a "daisy chain configuration". This means using a single connection cable among the various remote control units connected in series. In case of malfunctioning of a remote control unit, said cable does not disturb the functioning of the system.

A further advantage arises from the fact that the display unit is associated with a special optical filter (shown in FIG. 1) which allows a perfect display from a non-perpendicular angle; this happens thanks to the use of LCD displays positioned on a plane and having different inclinations with respect to the vertical connection. Said optical filter is capable of inclining, for example, the optimal display angle by 25°. In FIG. 1, the situation relative to the use of the optical filter is marked with "a" while the situation without the use of an optical filter is marked with "b".

As shown in FIG. 2, it is possible to associate the screens with a further optical filter capable of limiting the display, for example, by 30°, either on the horizontal or vertical axis or on both axes in order to prevent the adjacent spectators from getting an undesired view of the single screen and to reduce flash lightning emissions the LCD display retro-illumination system in the projection room. In FIG. 2 SP indicates a generic spectator and SC indicates a corresponding screen of the remote unit. The VA angle is relative to the area made visible by the use of the new screen and the non-visible area is indicated with NVA. In the upper part of FIG. 2, VAW indicates the visible area without filtering.

In the theatral field, a "courtesy light" contained in a remote control unit has proven very useful being said light capable of illuminating objects underneath such as opera booklets, theatre programs and so on.

BRIEF DESCRIPTION OF THE DRAWINGS

These and other advantages and characteristics of the invention will be best understood by anyone skilled in the art from a reading of the following description in conjunction with the attached drawings given as a practical exemplification of the invention, but not to be considered in a limitative sense, wherein.

DESCRIPTION OF THE PREFERRED EMBODIMENTS

Figure 1:
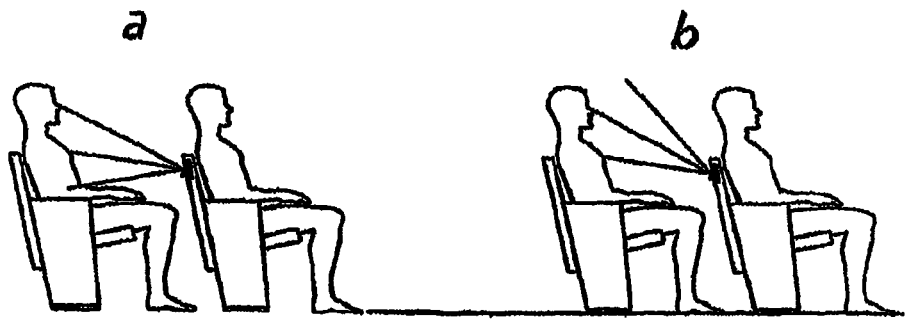
FIG. 1 is a schematic lateral view of a series of armchairs which shows the comparison between a traditional screen (disposed in the right-hand part of the drawing) and a possible embodiment of a screen for a remote control unit according to the invention.
Figure 2:
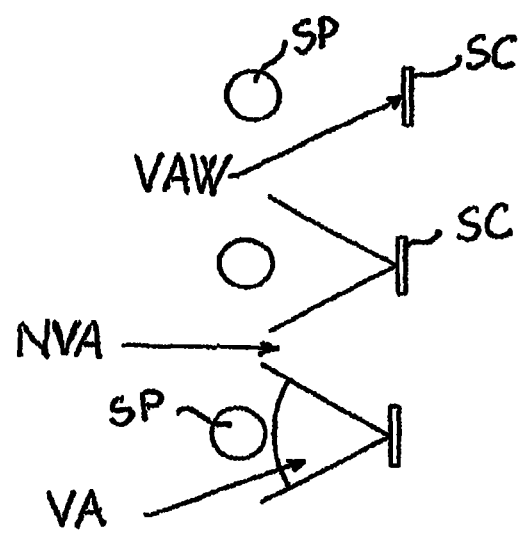
FIG. 2 is a diagram which illustrates the features of a particular type of optical filter mounted on an embodiment of a remote control unit according to the invention.

As previously said, the system of the present invention consists of a central unit connected to a plurality of remote units by means of a bidirectional signal transmission network.

The units of the system, with reference to their corresponding structural features, are described below.

In the central unit is resident an application software which allows the control of information to be sent to remote control units with different modalities. Possible embodiments are the following modules: "base module", "theatre module" and "congress module".

The base module is provided with configurations relative to contents to be transmitted through the various information channels, comprising live reproductions or reproductions from files or databases; in the second modality it is possible to select, for each channel: an auto-restart modality; an auto-restart modality with an initial or final welcome and/or utility message; a link with another file, with a possible auto-restart function, or external sensor activation present on the remote control unit; from the keyboard of the remote control unit, from the operator and so on, configuration and enabling criteria of the remote storage of contents.

The theatre module has all the functions which are necessary for a multilingual translation of lyric operas, musicals, prose and so on, as well as the use of live data inputs in addition to the above functions.

The congress mode has additional functions relative to the management of a "conference" in terms of booking, votes and printing of votes. To operate the congress module it is necessary to install a corresponding hardware congress module on the remote unit so as to manage the conference and the voting.

The central software is provided with two distinct modules: the administrator module and the operator module.

In the administrator module, which is protected by a password, it is possible to utilize functions regarding the software configurations in order to allow the following operations:

control and configuration of the transmission parameters of the wired network contents and corresponding transmission/reception of a second wired and/or radio level;

control and configuration of the software in order to allow the saving and printing of contents regarding resident information and system setting;

test and communication functions with all the peripheral units, zones of the system or a single peripheral unit;

live input enabling and configuration functions for information to be distributed on the network;

screen structure configuration functions visible on the remote units which comprise the type of information to be displayed and its collocation on the screen such as initial welcome and/or utilities information on each single screen portion (enabling which occurs in a given time or in a fixed time);

configuration functions of the keys present on the UR (remote units) and their functions;

reception and control of statistical data coming from remote units such as unit percentage used during the events, preference of the selected language, channel, vote and so on;

reception and control of group dynamic combination requests of other remote units in interactive modality and so on;

The operator module, which is preferably very intuitive and easy to use, contains all the modules that allow its use in all the different environments it is destined for.

To exemplify, there can be the following modules:

Base module or server.

Figure 3:
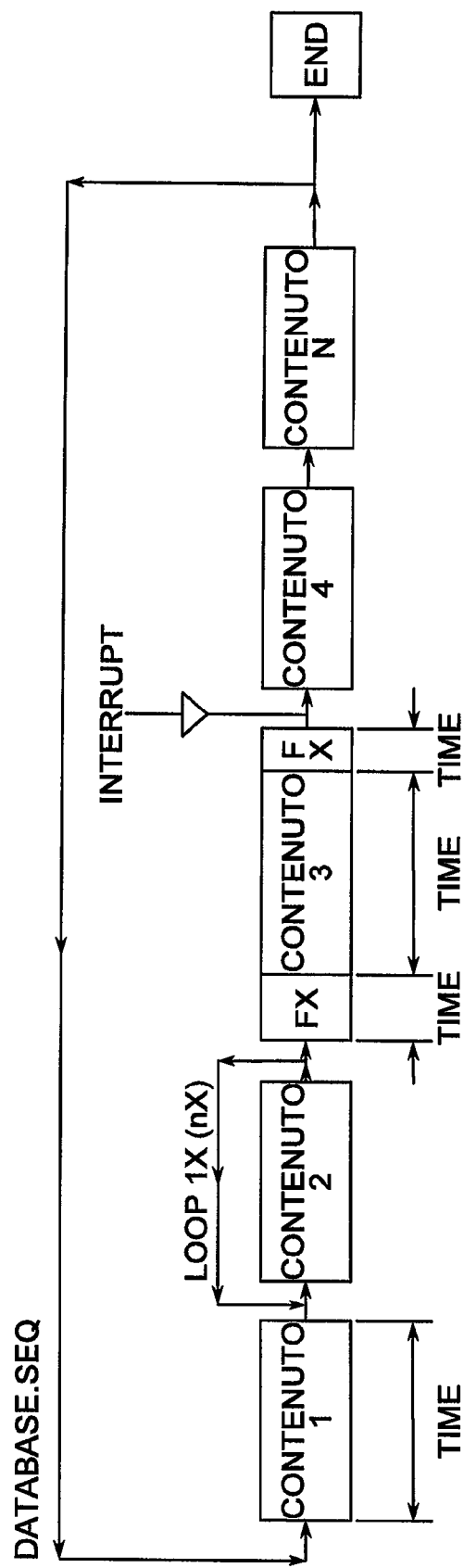
FIG. 3 is a block diagram relative to information to be sent using a system according to the invention.
Figure 4:
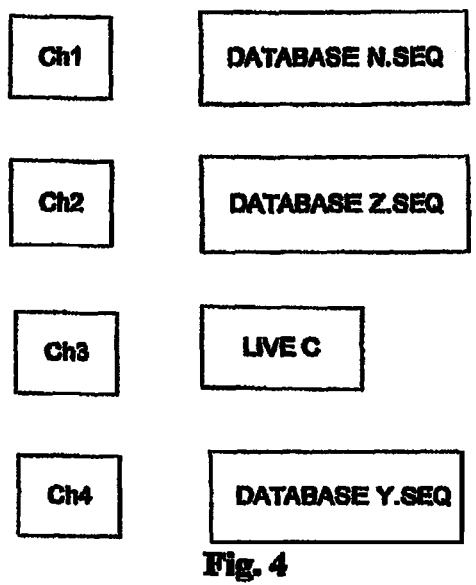
FIG. 4 is a block diagram relative to a database assignment of a transmission channel.

This module is capable of realising the following four functionalities:

1. Selection of the information groups to be sent, as shown in FIG. 3 where the word "CONTENUTO" (content) means video (for example the Mp4 type) or graphic image (for example the Jpg type); in the diagram "FX" indicates the transition effect and "TIME" indicates the duration of the event. This functionality allows the creation of a file (for simplicity's sake this file has been called "DATABASE.SEQ") and it comprises: the contents, the reproduction sequence, the display duration of every single content, the type of transition effect between a content and the other content, its parameters, the cyclicity associated with every content or with content sequences, the presence of interrupts. The database assignment is exemplificatively shown in FIG. 4 where Ch1 to Ch4 indicate the channels and "LIVE" indicates a corresponding live input.

Figure 5:
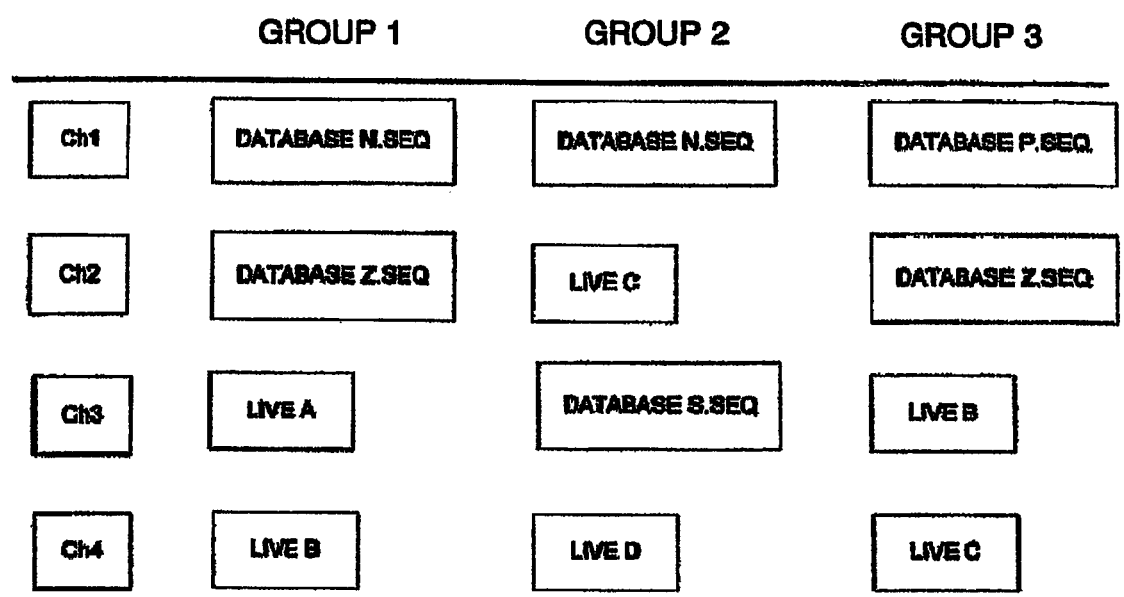
FIGS. 5 and 6 are block diagrams relative to database assignments in differentiated groups relative to transmission channels.
Figure 6:
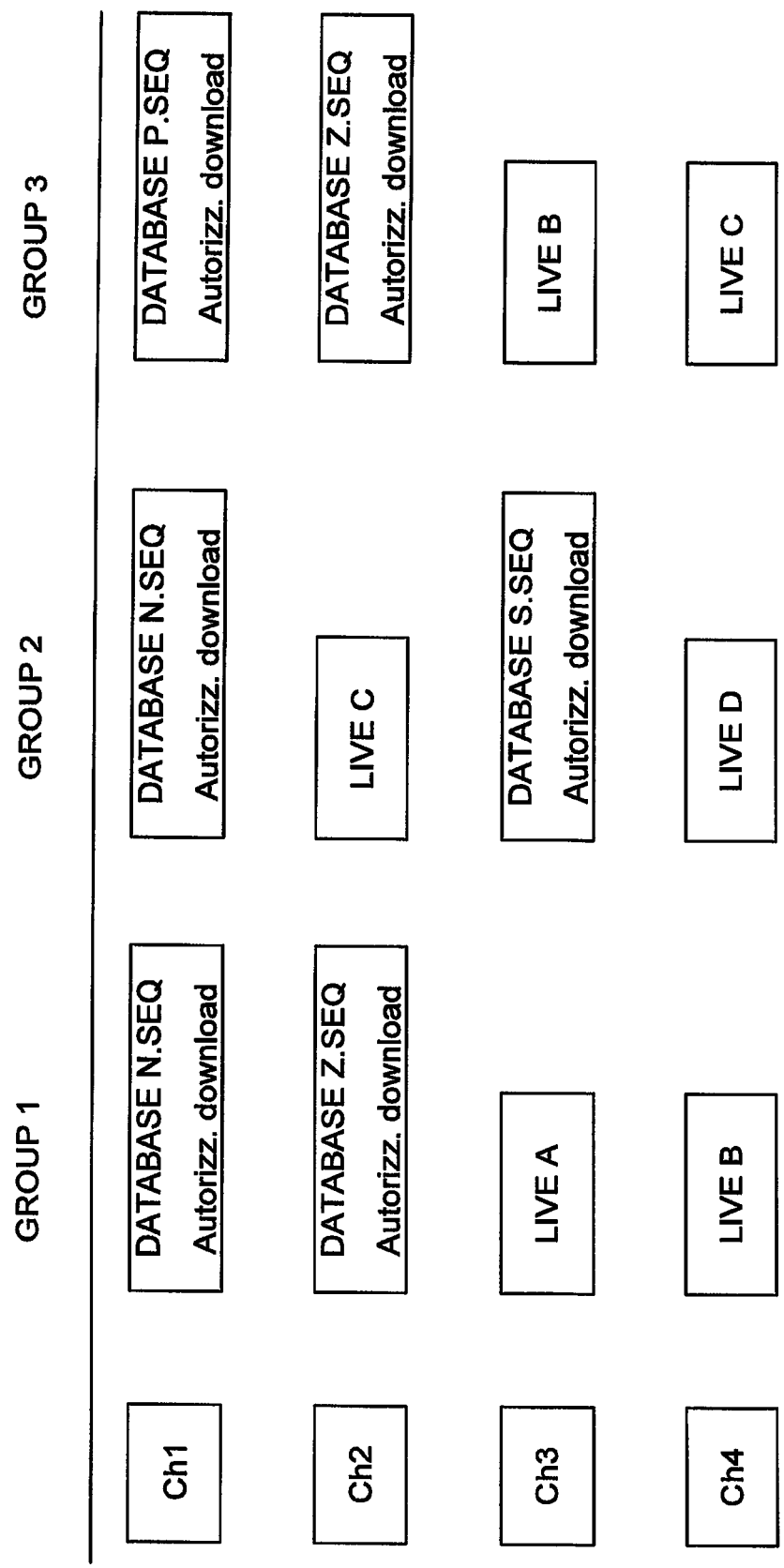

2. Formation and selection of groups or sectors of remote units to which information is to be sent. This functionality allows the assignment to address groups or address intervals in remote units. The assignment takes place by means of a remote unit synoptic selection. This functionality is shown more in detail in FIGS. 5 and 6, in which is used the word "GRUPPO" for group, and the words "Autorizz. download" for the download authorization.

3. Display configuration administration and remote control unit data reception as well as autonomous functioning modality, interactive functioning enabling of the system, enabling of a single receiver, group, or channel to the storage of data displayed or present in the buffer.

This functionality allows the operator to authorize groups of remote units to the fruition of additional functionalities. In the example shown in the block diagram of FIG. 6, the operator can authorize said groups to download some contents. Further possible enablings are relative to interactive functions with data sending from the remote unit to the central unit.

4. Reception modality. The software is provided with a reception modality of the following data returning from the enables remote units:

reception of statistical data;

audio and video input reception coming from an optional remote unit;

reception of the enabling request for transmitting from the remote unit;

reception of the request for a group dynamic combination of other remote units in interactive modality and so on;

preference data reception or vote from an optional module.

Figure 7:
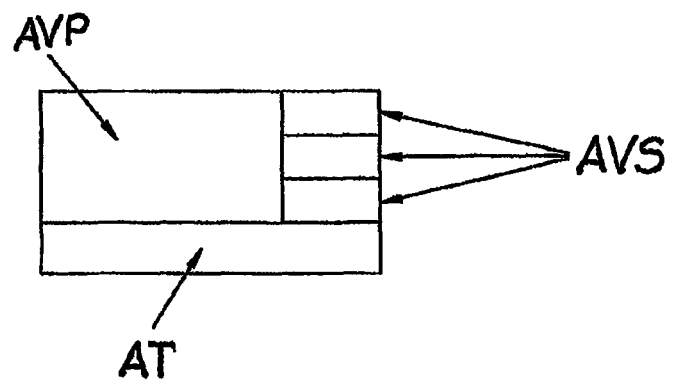
FIG. 7 is a schematic view of a possible display device embodiment of a remote unit.

As regards the remote unit software, the applicative software is capable of controlling the display of generic contents on a display device which is subdivides as shown in FIG. 7. In this figure, the main video area AVP displays by default the content of channel 1 or the content of the channel selected by the user as main channel, the secondary video areas AVS display by default the contents of channels 2-3-4 or of those channels which have not been selected by the user while the text area AT displays only text.

An open applicative software, which is very versatile and capable of directioning the various requested information channels on the software platform, is combined with the user endowed units, with a modular structure which is capable of housing other interactivity functions (for example a smart card, a USB key, video camera, voting, touchscreen and so on).

The same remote units are provided with an advanced security level which allows protection from undesired access via network or via radio to the protected storage parts.

The remote unit has a compact size and low electric absorption. Its size can approximately be 5-7-10 inches diagonal widescreen.

The unit preferably uses a single key, trackball or touchscreen for its functioning and consists of:
- a main part which comprises the main components for its functioning which are capable of housing a congress module connected to a dedicated connector;
- an optional module hw congress on a remote unit, with selectable functions and a connector for an external microphone, possibly consisting of a luminous ring for identification/signaling as well as a connector for external speakers; the microphone input provides a low noise preamplifier/compressor and a narrow diagram electret capsule management; the module has its own univocal address which can be configured from remote; the hw module can be inserted into the main remote unit, even subsequently, without mechanically modifying it and without modifying its hardware;
- two optional modules for the courtesy light and a presence sensor for applications in museums.

The remote control unit contains the functions listed below:
- self-switching and self-test in the presence of a first power supply;
- silent and diagnostic automatic reset;
- predisposition in autonomous functioning modality in case of positive self-test, waiting for signals coming from the central direction which indicate a state of perfect functioning by means of the screen or by retro-illumination of the command key; (the autonomous functioning allows the device to execute a sw internal routine while waiting for the functioning modality imposed by the central system);
- auto-configuration function in the system, determined by the position of the unit and imposed by the central sw, and the sending of its status code towards the central system, if questioned, as well user preference information locally stored during the previous concluded events. Any transmission of information from the remote units to the central system is possible only if the bus Tx is free (condition CHBUSY off).

The local software allows a very easy use by displaying the command activable by icons of interpretation extremely easy.

The available functions will be: the choice of main channel viewable on an available menu, the storing of available information and entitlements of central sw. The switching on of the optional "courtesy light" is a further function which the user can choose to utilize.

The congress option allows vote preferences, an enabling request for audio channel and the corresponding use of a microphone that can be enabled either automatically or in the discretion of the system operator.

Figure 8:
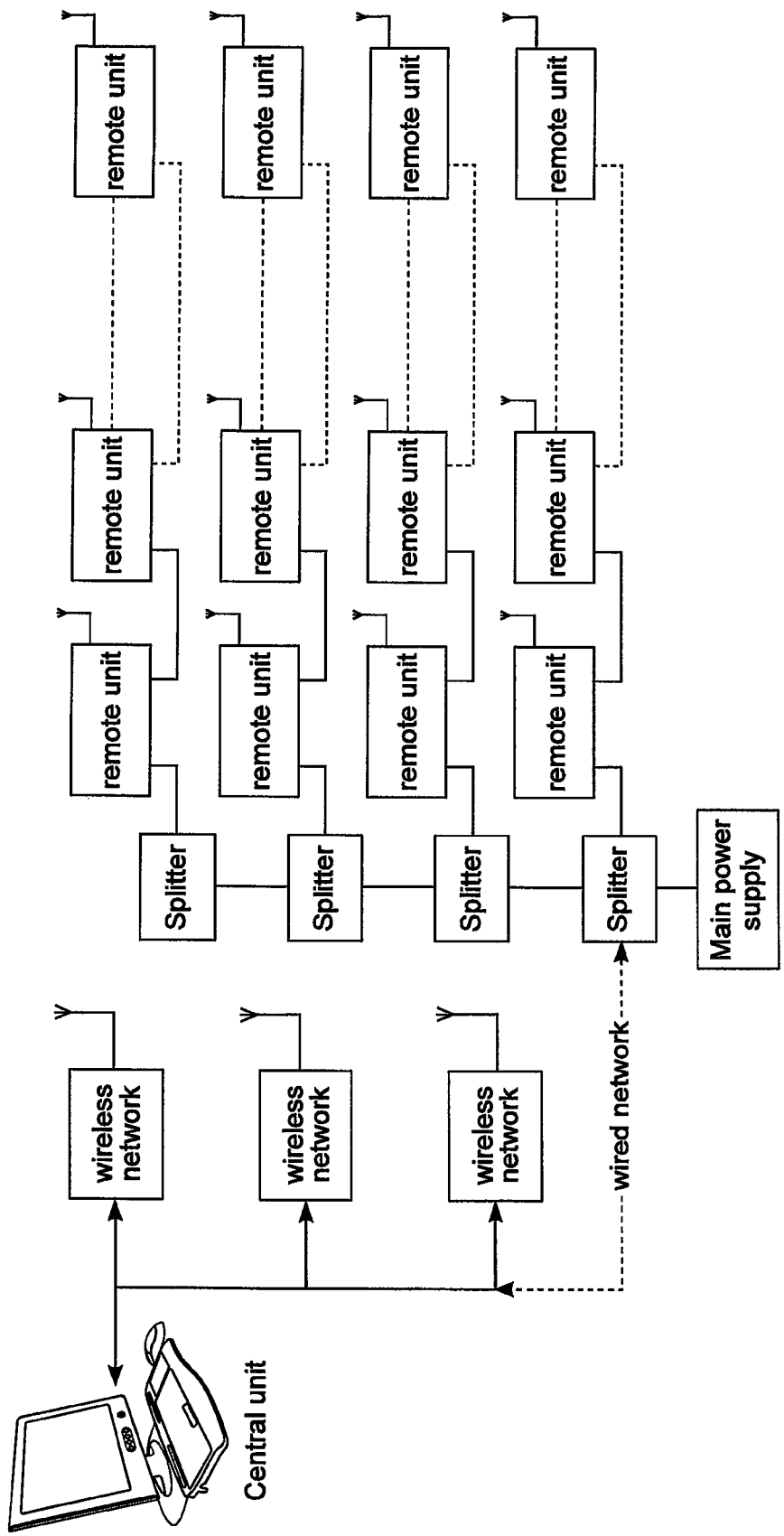
FIG. 8 is a diagram representing transmission modalities of information.

As shown in the diagram of FIG. 8, some splitter units are disposed between the central unit (called "Unita central" in the drawings) and the remote units (called "Unita remota") (In the drawings, the data wireless network is called "Rete dati wireless", while the cabled network is called "Rete dati cablata"). Each splitter unit, which allows an easy installation and distribution of signals in the system is very compact and allows both a derivation of signals in the main branch and the feeding of remote units connected to its shunts.

The splitter unit regenerates and decouples the signal coming from the main branch and generates four system derivation branches complete with power supply, each capable of controlling up to sixteen remote units for each branch. For each output branch, the splitter provides protection for the circuits downstream by means of auto-resetting protections calculated on the maximum absorption value of the remote units connected to it. The splitter contains feed adjusters for its internal circuits as well as diagnostic lights (presence of power, input and output signal). The CHBUSY signal control on the main branch is supported by the splitter towards the derivation branches.

The splitter unit is provided with the following connectors:
- two feed connectors 24 VDC IN/OUT;
- two data connectors from the branch provided with the following pin codes:
  - data IN/OUT and power –
  - data IN/OUT and power +
- four derivation data connectors with the same pin codes mentioned above.

The splitter unit can also be provided with the same processing means for an easy control of the network displays.

Figure 9:
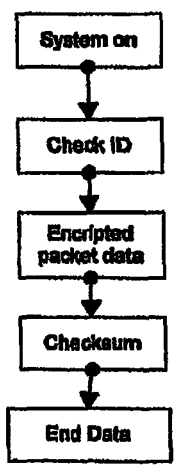
FIG. 9 is relative to a possible embodiment of a series of signals for synchronizing remote units.

Information is sent to the central unit in broadcast modality by means of an interface which transfers all the information to the receiver in a wired modality and/or via radio through suitable units. The system transmits an OK status flag which allows the remote control receivers to synchronize while waiting for information (see example in FIG. 9). Before receiving the OK status, the receivers operate in a stand-alone modality with routines charged by the firmware contained in them.

This functionality allows protection of the units from possible thefts or non-authorized removals since the unit which is not connected to the system is also not enabled to any other functioning unless the system operator reconfigures it or authorises said functioning.

Moreover, the data package identifies a channel which can be stored in an internal storage, ready to be called.

It is also possible to use routine software on user request or as auxiliary means for the interactive functions of the device or for the network upgrade firmware modality as well as a reproduction modality if requested by previously displayed information or information displayed on different channels.

The data transmitted by remote units use a different transmission modality.

Video information or return data towards the central unit use a different bidirectional interaction level by using a control owner's protocol for the different questioning functions or functions for sending data towards the central server.

The transmission units are combined with a univocal address thanks to which they can be detected in the request and access network to the central system.

The assignment of the univocal address can be predetermined by the system administrator in remote modality. This facilitates the network configuring operations during the physical installation of the units.

Communication takes place by means of compressed data packages so as to avoid a slowdown in the network traffic and congestion in activity peaks.

A possible transmission string of information from remote control units to the central software can be as follows:

| | |
|---|---|
| ck CHBUSY status | (inspection available from the transmission channel); |
| CHBUSY on | (flag active for all the duration of the transmission); |
| IDUR | (address of remote control unit); |
| Information | (statistical data, vote request, booking/conference/digital audio); |
| EOF | (end of transmission); and |
| CHBUSY | (end of occupied channel). |

The remote unit comprises a multimedia microprocessor dedicated to the purpose which is capable of combining extremely reduced dimensions and consumption with a processing power of the signal received which is equal to a computer complete with all the interfaces and peripheral units as well as the operating system and the necessary applicative programme.

In its interior, the circuit is provided with audio/video and graphics accelerators as well as a SRAM and ROM memory.

Said circuit has all the interfaces necessary to pilot STN or TFT colour displays up to a VGA resolution and input and interface circuits of the input digital signals.

A second module combined with the circuit retransmits the communications from the single remote units to the main command system in autonomous and bidirectional modality.

The system administration software interprets the signals and retransmits them to the main network in the modalities set by the system administrator.

In its interior, the microprocessor in provided with the applicative software necessary for its use.

The system described with reference to the example of FIG. 10 receives data from a couple of cables suitably twisted 1 (twisted duplex cable) used for the slow recharge of apparatus.

An interface buffer 2 (downstream of said duplex cable) allows the electrical separation of the unit from the rest of the circuit and a first data preamplification. The same module allows the recharge power to be directed towards the low current recharge circuit 3.

The recharge circuit is combined with an extremely compact lithium battery 4.

A high performance DC/DC converter 5 is connected to the battery and is capable of generating all the voltage necessary for the functioning of said circuit. Moreover, the DC/DC converter 5 functions with elevated frequencies so as to avoid any sound emissions of the circuit in the external environment. This feature proves very useful when said devices are disposed into hall rooms or environments with an extremely accurate acoustics such as theatres and auditoriums.

The circuit is controlled by a very powerful dedicated multimedia microprocessor 6 provided with the following circuital features:

operative system support (for example "Linus") with dedicated driver and firmware applicatives;
interface towards the LCD TFT smart panel display with backlight control 7;
SRAM, ROM external system memory 8;
USB-OTG hi speed output 9;
GPS module dedicated input 10;
memory stick Pro, MMC, SD-card inputs 12;
trackball or keyboard input 13;
touch-screen controller input 14;
tele-camera dedicated input 15;
audio-codec inputs/outputs 16;
video digital demodulator input 17;
high speed infrared port output 18;
clock inputs 19;
A further interface to the external storage systems or user card system 20 is connected to the processor.

The whole circuit is commanded by the user by means of a single enabling/selection key 21.

A bidirectional communication module 22 is connected to the main circuit by means of a transmission/reception codificator.

The module consists of a transponder 23 which communicates with the central system in digital, bidirectional modality through wideband to avoid congestion of the dedicated radio tracts and to provide an adequate communication speed.

A keyboard 24, which is configurable by the system administrator during each event, allows the user to express preferences, to vote, to send SMS or to select topics of interest.

The system can be provided with an optional touchscreen membrane with a corresponding interface or trackball 25 as well as a presence detection circuit 26 and a TV output 30.

Figure 10:
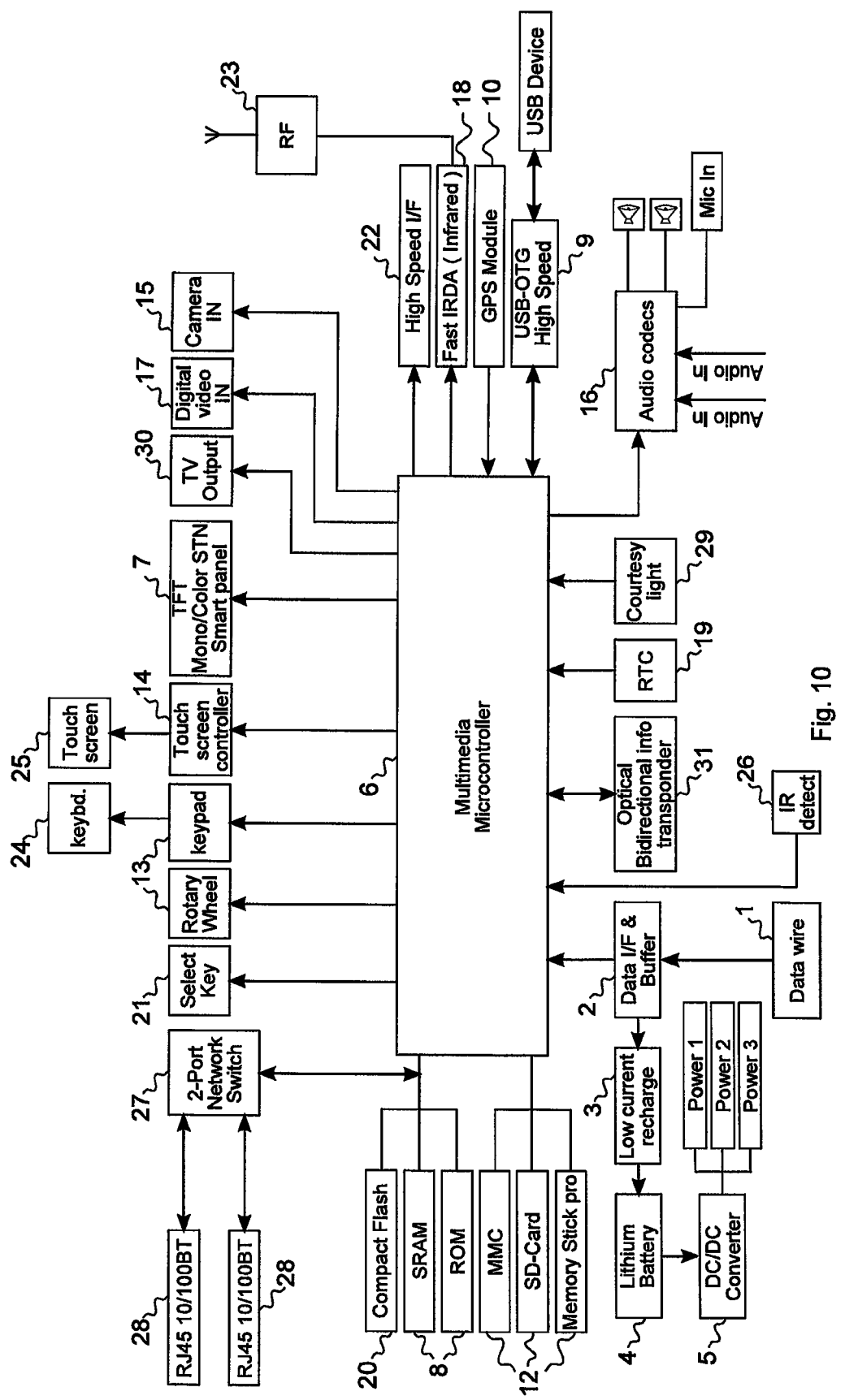
FIG. 10 is a block diagram relative to a possible embodiment of a remote unit according to the invention.

The example illustrated in FIG. 10 is provided with a diagnostic interface management circuit toward the wired network which comprises input/output data connectors independent of the power supply 27 and 28.

An optical bidirectional information transponder 31 is also foreseen.

A courtesy light circuit 29 completes the device.

Figure 11:
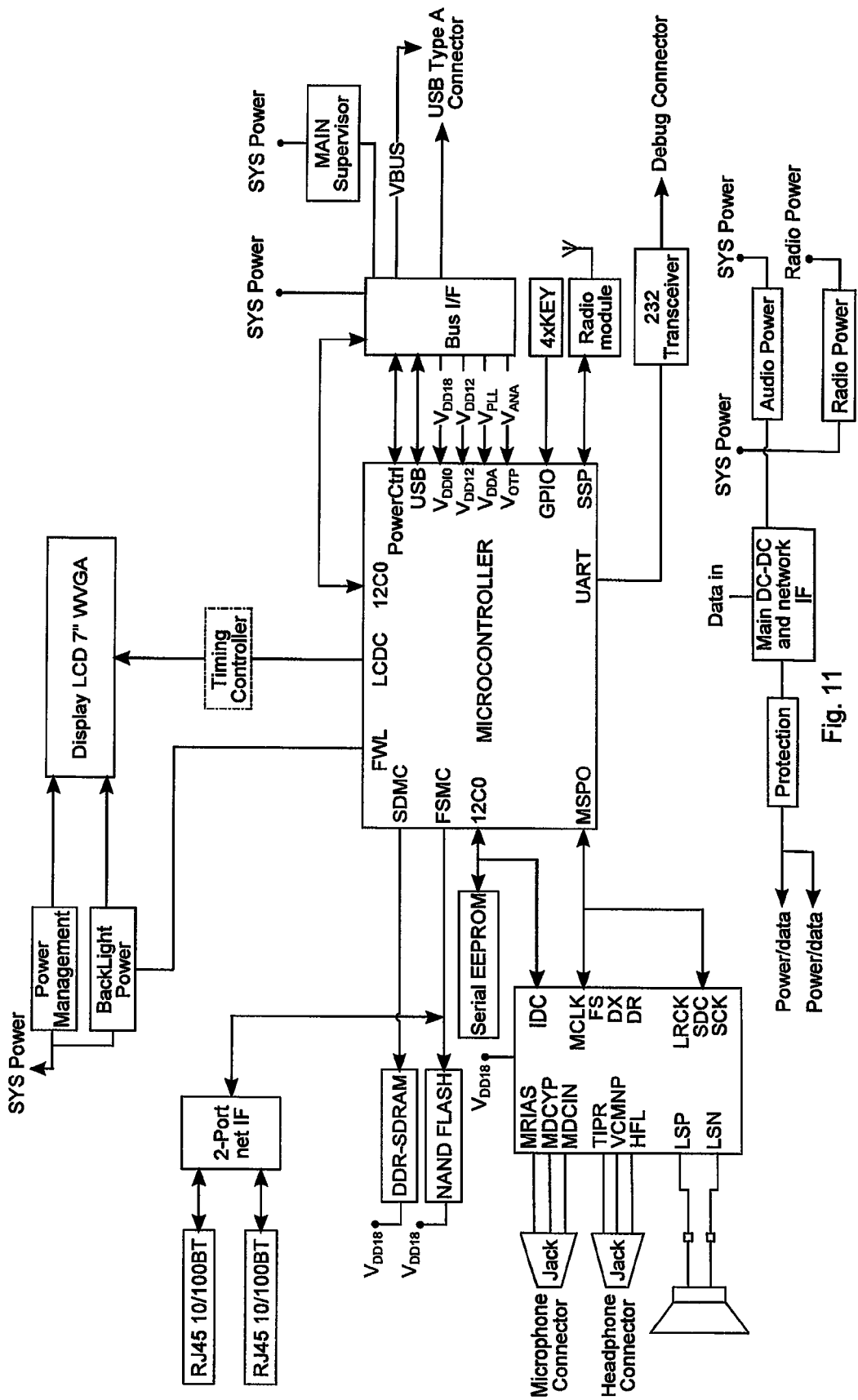
FIG. 11 is a block diagram relative to a possible embodiment of the invention.

FIG. 11 shows a diagram with possible connections to the remote unit microcontroller.

The application is as an extremely useful and professional instrument for the single user in the following application fields: congress and meeting halls; council chambers, trains, transport means, theatres, auditoriums, convention halls, religious buildings, sports places and stadiums.

The technology of the invention can be introduced into each of the above contexts thanks to its compact and customizable size and to its reduced consumption, qualities that render it easy to apply on armchair backs, on walls, totems or portable units.

In the congressual field, the system consists of a number of bases enabled to discussion and voting and of bases capable of receiving information relative to debates. All the system bases are used to receive a multilingual simultaneous translation relative to the debate, comprising the image of the speaker present at the meeting, even on a remote control site (teleconference). Moreover, each user can intervene in the conference if enabled by the system administrator.

In the theatral field, the system consists of data receivers on different channels that can be selected by the user. In addition to the image of the stage, it is possible to display the image of the orchestra director and the different translations in various languages of the theatral works performed. It is possible to obtain further information on theatre programmes, availability of tickets, on the cast, on the foregrounds of the soloists and so on.

In the sports field, the system, on each remote unit, allows the display of information coming from the central system with those coming from an external video shooting with the opportunity of choosing the desired shooting channel, the replay of the most important actions, the required statistical data and information including the possibility of downloading the enabled information.

In the museal field, in cultural fields and religious buildings, the system foresees various positions located in places where people usually pass and said positions are only enabled in the presence of visitors. Each visitor can receive the required information on the selected channels even in continuous modality. Moreover, the system recognizes the type of users (adults, children, foreigners, beginners, experts) through a smart card activation inserted in the position and broadcasts the consequent information.

A combination with an optional GPS receiver allows the portable unit to be activated exactly in the place selected by idoneous information. Said function is particularly useful in archeological sites and in theme parks.

In the didactic field, the system can help pupils thanks to an audio-video data support in communication with the teacher who can receive the requested answers from his pupils and send statistical data and answers to the whole class.

On transport means, the system entertains each single passenger and provides information on different selectable channels (travel information, travel connections, prices).

The command and control organs of the above elements illustrated in the enclosed drawings are well-known to the technicians who work in this field and have not been described in more detail for simplicity's sake. Moreover, the execution details may equally vary as regards shape, size, disposition of elements, kind of material used, within the limits of the solution idea that has been adopted and within the limits of the present invention.

The invention claimed is:

1. Multimedia and multichannel information system for an interactive distribution of at least one real-time video input of a live event taking place in an auditorium, the system comprising:
   a central unit; and
   a plurality of remote units located in the auditorium,
   wherein at least one of the plurality of remote units is connected to the central unit by means of a bi-directional transmission network for interactive communications between the remote units and the central unit,
   wherein the at least one remote unit is provided with at least an interface and with audio/video, data and graphics accelerators disposed on a multimedia microprocessor housed in the remote units, and
   wherein the at least one remote unit is equipped with a touch screen display and is configured to display the at least one real-time video input of the live event taking place in the auditorium, and
   wherein the display of the at least one remote unit is provided with an optical filter which can restrict the view on the horizontal axis, vertical axis or both, to avoid unwanted vision of a screen to other adjacent spectators, such that the restriction of the view is performed without a user changing an orientation of the display.

2. The system of claim 1, wherein the at least one remote unit is configured to customize the at least one real-time video input of the live event displayed on its touch screen display.

3. The system of claim 1, wherein the system is configured to distribute the at least one real-time video input to the remote units in compressed data packages.

4. The system of claim 1, wherein said bi-directional transmission network comprises a program suitable for transmitting, from the central unit to the remote units, data, audio, video and/or graphics signals related to the live event and to interactively receive from a remote unit to the central unit data and/or audio video signals.

5. The system of claim 1, wherein said transmission network includes a cable interconnecting remote units of a group of remote units in a daisy chain configuration for a signal and power supply distribution among the group of remote units, and wherein a splitter unit is disposed between the central unit and the group of remote units for decoupling a signal coming from a main branch.

6. The system of claim 1, wherein the central unit is configured to recognize a remote unit's user and to dynamically assign a membership of the remote unit according to at least one of the group of language, company, importance, user's area or location, user's functions.

7. The system of claim 1, wherein the microprocessor housed in the at least one remote unit is provided with: a support for an operating system with dedicated application software; an interface to the remote display unit; an external system memory SRAM, ROM; an output for USB-OTG hi-speed; a dedicated input for GPS module; an input for memory stick Pro, MMC, SD-card; an input for entering data or to perform one or more choices; one or more inputs/outputs for audio codec; a input for demodulating digital video; one or more inputs for clock.

8. The system of claim 1, wherein the bi-directional transmission network is configured for an information exchange among a first and a second remote unit of the plurality of remote units.

9. The system of claim 1, wherein the system is configured to store the at least one remote unit's choice of channels which are being displayed or listened to and of downloaded data to allow a display of statistics.

10. The system of claim 1, wherein the central unit comprises a theatre module configured to provide the at least one remote unit with a simultaneous multilingual translation of lyric operas, musical, or prose beside a live data input from the live event.

11. The system of claim 10, wherein the at least one remote unit is provided with audio connectors for headphones or speakers of different channels of the simultaneous multilingual translation.

12. The system of claim 1, wherein the central unit comprises a congress module configured to provide a conference booking functionality, a vote reception functionality of a vote from the at least one remote unit's user, or a vote printing functionality.

13. The system of claim 1, wherein the at least one remote unit comprises a presence sensor for identifying the presence of a spectator associated to the remote unit.

14. The system of claim 1, wherein the display of the at least one remote unit is provided with another optical filter which is configured to further limit a display angle with respect to the user.

15. The system of claim 1, wherein the at least one remote unit is provided with a courtesy light which can be activated by the user to illuminate objects placed under the remote unit.

16. The system of claim 1, wherein the at least one remote unit comprises a DC/DC converter employing elevated frequencies in order to avoid sound emissions of the remote unit to the auditorium.

17. The system of claim 1, wherein the at least one remote unit is fixedly installed within the auditorium.

18. The system of claim 17, wherein the at least one remote unit is installed on an armchair, seat writing tablet or a wall of the auditorium.

19. Using the multimedia and multichannel information system of claim 1 for interactively watching the live event in the auditorium using at least one of the plurality of remote units.

20. The system of claim 1, wherein the at least one remote unit comprises a connector for an external microphone.

\* \* \* \* \*